Jan. 31, 1961 V. N. MAZUR 2,970,249
ADJUSTABLE SPEED ALTERNATING CURRENT MOTOR DRIVE
Filed April 15, 1958 2 Sheets-Sheet 1

WITNESSES
John E. Hensley, Jr.
E. Herbert Liss

INVENTOR
Victor N. Mazur
BY
ATTORNEY 2,970,249
Patented Jan. 31, 1961

2,970,249

ADJUSTABLE SPEED ALTERNATING CURRENT MOTOR DRIVE

Victor N. Mazur, Tonawanda Township, Erie County, N.Y., assignor to Westinghouse Electric Corporation, East Pittsburgh, Pa., a corporation of Pennsylvania Filed Apr. 15, 1958, Ser. No. 728,659

3 Claims. (Cl. 318—46)

This invention relates to an adjustable speed alternating current motor drive and more particularly to an induction motor, adjustable speed drive.

In the past, the conventional method of obtaining variable speed motor operation from an alternating current supply has been to use a wound rotor motor with variable secondary resistance. This scheme has a number of inherent disadvantages among which is the poor efficiency at reduced speeds. At reduced speed, the rotor efficiency is substantially the same as the percent synchronous speed, and the motor efficiency is still further reduced by stator losses.

It is desirable for an adjustable speed drive to be capable of handling a constant horsepower load with no increase in current or power at reduced speed or to handle a constant torque load with reduced power and current at reduced speed. Speed ranges of up to 3 to 1 are required in certain applications. Such applications include machine tools, cranes, hoists and rock drills. It is also important that good speed regulation be obtained.

The principal object of the present invention is to provide an adjustable speed drive that can be operated from an alternating current supply.

Another object of this invention is to provide an adjustable speed drive operated from an alternating current supply having improved efficiency and good speed regulation.

A further object of this invention is to provide an adjustable speed drive operated from an alternating current supply having improved efficiency, good speed regulation and which is capable of handling a constant horsepower load with no increase in current or power input as the speed is reduced.

Other objects and advantages of the invention will be apparent from the following detailed description taken in connection with the accompanying drawings in which.

Figure 1:
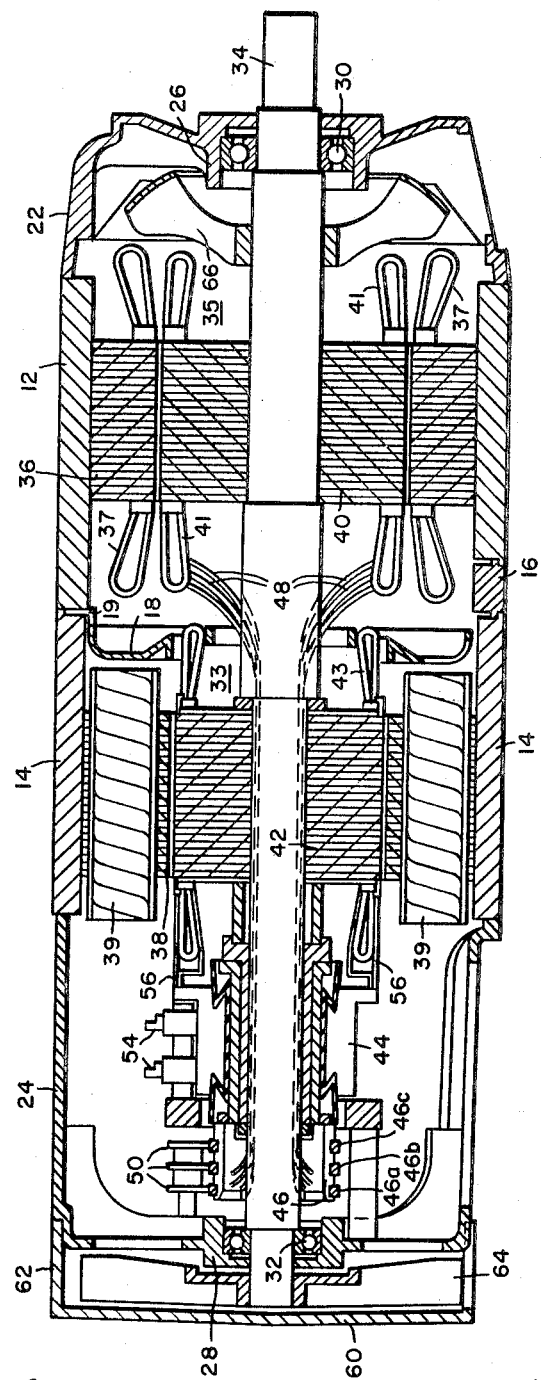
Fig. 1 is a longitudinal sectional view of one embodiment of the motor drive of this invention.
Figure 2:
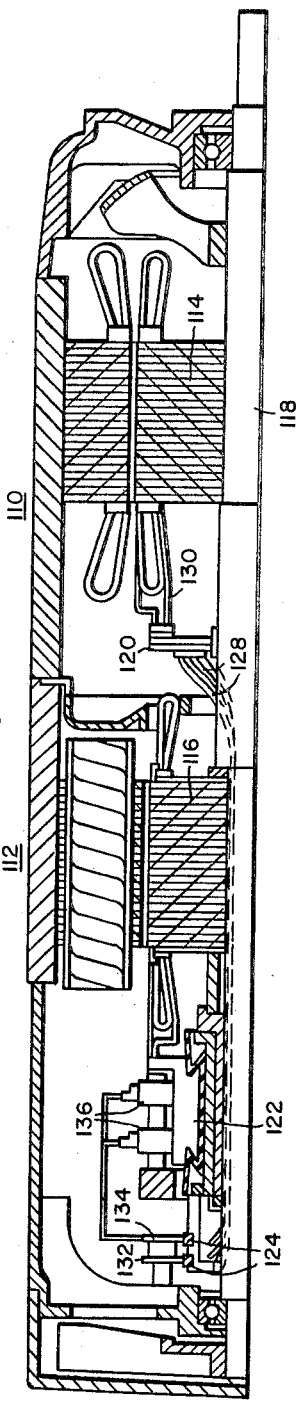
Fig. 2 is a longitudinal sectional view of a modification of the motor drive of this invention.

Referring now to the drawings and particularly to the embodiment illustrated in Fig. 1, there is shown a housing 10 which includes an alternating current motor frame 12 and a direct current motor frame 14. Intermediate the motor frames 12 and 14 is an adapter ring 16. The frames 12 and 14 and adapter ring 16 may be secured together in any suitable manner as, for example by bolts (not shown). An annular baffle 18 is mounted by a flange 19 and bolts (not shown) intermediate the adapter ring 16 and the direct current motor frame 14. The baffle 18 extends inwardly of the housing 10. The remote ends of the frames 12 and 14 are closed by end brackets 22 and 24, respectively. End brackets 22 and 24 have formed centrally thereof bearing housings 26 and 28, respectively, in which are housed bearings 30 and 32. A central, hollow, rotatable shaft 34 is supported at its ends in bearings 30 and 32.

Figure 3:
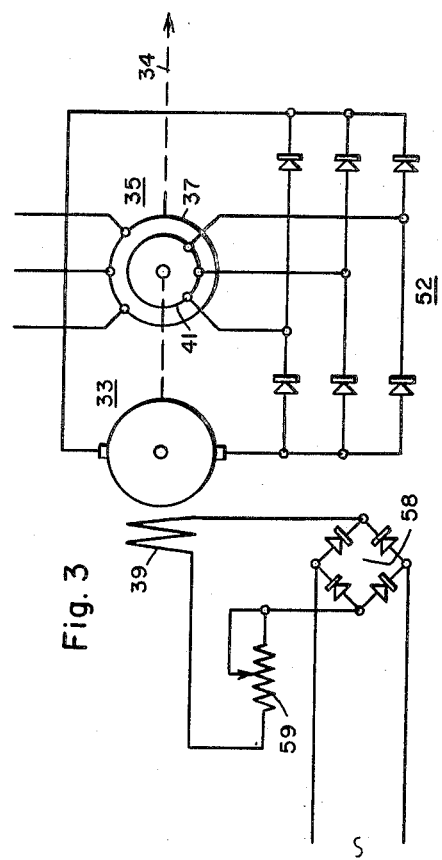
Fig. 3 is an electrical diagram illustrating a form of this invention.

The machine has two separate motors housed therein, a wound rotor, alternating current induction motor 35 and a direct current, separately excited motor 33. A stator member 36 carrying an alternating current stator or primary winding 37 is mounted in the frame 12, and stator member 38 carrying a direct current field winding 39 is mounted in the frame 14. A rotor member 40 carrying a three-phase, wound rotor, secondary winding 41 is mounted on the shaft 34 within stator member 36, and a rotor member 42 carrying a direct current armature winding 43 is mounted on the shaft 34 within stator member 38. A commutator 44 is supported on the shaft adjacent the end of the rotor 42 remote from the rotor 40. Mounted on the shaft 34 adjacent the commutator 44 is a set 46 of slip rings 46a, 46b and 46c. The shaft 34 is slotted so that leads 48 from the secondary winding 41 pass through slots in the shaft and are connected to the slip rings 46. The slip rings are connected through brushes 50 to the input of a three-phase, full-wave rectifier 52 (Fig. 3). The output of the rectifier 52 is connected to commutator brushes 54 which supply power to the direct current armature winding 43 through connectors 56. The rectifiers 52 may be mounted externally to the motor, as shown in the Fig. 1 embodiment, if desired, or may be mounted on the shaft for rotation therewith, as illustrated in Fig. 3. The rectifiers may be of any suitable type as, for example, the dry plate type or semiconductor rectifiers of silicon or germanium. A cover plate or cap 60 is secured in any suitable manner as, for example, by bolt 62 to the end bracket 24. Within the cover plate and external to the end bracket 24 is mounted a fan 64. At the other end of the shaft within the end bracket 22 is mounted a second fan 66.

From the above description, it is apparent that there is provided an adjustable speed drive consisting of a wound rotor induction motor 35 and a direct current motor 33 connected to the same output shaft and a semiconductor rectifier. The rectifier rectifies the slip power from the rotor 40 of the induction motor 35 and supplies direct current power through the armature of the winding 43 of the direct current motor 33. The direct current motor converts the slip power from the wound rotor secondary to mechanical output. The characteristics of the drive are inherently constant horsepower. The field of the direct current motor is separately excited to permit speed control. Speed range is determined by the base speed of the direct current motor and the relationship of the rated voltage to the induction motor rotor voltage.

Excitation for the direct current field is supplied through a full-wave rectifier 58 from any suitable alternating current source. A speed control rheostat 59 is provided in series with the output of the rectifier 58 and the field winding 39 of the direct current motor.

The operation of the alternating current motor portion of the drive is like that of a conventional wound rotor motor. The direct current machine, on the other hand, provides the unique characteristics of this invention. A counter E.M.F. is generated by the direct current motor which bucks the rectified alternating current rotor circuit voltage. The difference between these voltages is such that the rectified rotor voltage is just sufficient to circulate the load current through the alternating current rotor, the rectifier and the direct current armature. If the direct current motor field is weakened during operation, the generated counter E.M.F. decreases allowing more current to flow. This produces more torque in both alternating current and direct current machines, and the drive accelerates to a higher speed. As the speed increases, the rotor slip voltage decreases and the counter E.M.F. increases. Acceleration ceases when the voltages differ by the amount required to circulate running load current at the new speed.

Another modification of the invention is shown in Fig. 3. For the purposes of avoiding unnecessary details, a simplified illustration of the drive is shown in Fig. 3 and described. Fig. 3 shows in detail only those portions of the drive necessary to illustrate the difference between this embodiment and the Fig. 1 embodiment.

An adjustable speed alternating current drive is shown which includes a wound rotor induction motor 110 and a direct current motor 112 having rotors 114 and 116, respectively, mounted on the same shaft 118 and longitudinally spaced. In this embodiment, the rectifier 120, which corresponds to rectifier 52 in the Fig. 1 embodiment, is mounted on the shaft 118 and is rotatable therewith. By rotating the germanium or silicon rectifiers, which are preferably used in this modification, the power capacity of the rectifiers is greatly increased and a self-contained unit is provided. By mounting the rotating rectifier on the shaft, it is possible to eliminate one slip ring and the space it requires, resulting in a shorter motor. A commutator 122 and a pair of slip rings 124 and 126 are provided adjacent each other on the portion of the shaft adjacent the direct current armature and remote from the alternating current rotor. The shaft 118 is hollow so that the output leads 128 from the rectifier 120 pass through slots in the shaft and are connected to the slip rings 124 and 126. The input leads of the rectifier are connected to the wound rotor secondary, as shown at 130. A pair of collector brushes 132 and 134 connect the slip rings 124, respectively, to commutator brushes 136. Thus, the slip power of the wound rotor secondary is rectified by the rectifier 120. The direct current output of the rectifier is applied to the direct current armature through slip rings 124 and 126 and brushes 132 and 134 by means of commutator 122 and brushes 136. Except for the omission of one slip ring and the mounting of the rectifier on the rotating shaft, the motor drive last described is identically equivalent in construction to the Fig. 1 embodiment and the electrical diagram therefor is the same.

It will now be apparent that a new type of adjustable speed motor drive has been provided which is capable of carrying a constant horsepower load with no increase in current due to unique arrangement of components. By this arrangement, the slip power of the wound rotor motor secondary is converted to mechanical output which results in a high efficiency motor that is constant over an entire speed range of 3 to 1. The motor is inherently a constant horsepower output drive with exceptionally high pull-out torque. It is of unit frame construction with standard motors which make maintenance and installation extremely simple. It can be applied to nearly all applications requiring variable speed alternating drive with constant horsepower. The new motor drive utilizes semiconductor rectifier devices which have very uniform characteristics and are readily controllable in manufacture.

Certain specific embodiments of the invention have been shown and described for the purpose of illustration, but it will be understood that various other embodiments and modifications are possible and are within the scope of the invention.

I claim as my invention:

1. In an adjustable speed motor drive, a wound rotor alternating current motor and a separately excited direct current motor disposed in a unitary housing including a first stator core having a primary winding thereon supported in said housing, a second stator core having a direct current field winding thereon supported in said housing and axially displaced from said first stator core, a shaft supported for rotation within said housing, a wound rotor secondary mounted on said shaft for rotation therewith within said first stator core, a direct current armature mounted on said shaft for rotation therewith within said second stator core, a commutator for said direct current motor and a plurality of slip rings, said commutator and slip rings mounted on said shaft adjacent each other, means on said shaft for receiving leads within the circumference thereof, semiconductor rectifier means, leads received in said lead receiving means for connecting said wound rotor secondary through said rectifier means to said slip rings, brush means for connecting the output of said slip rings to said commutator, an independent direct current power source for said field windings and means for varying the strength of said direct current field.

2. In an adjustable speed motor drive, a wound rotor alternating current motor and a separately excited direct current motor disposed in a unitary housing including a first stator core having a primary winding thereon supported in said housing, a second stator core having a direct current field winding thereon supported in said housing and axially displaced from said first stator core, a shaft supported for rotation within said housing, a wound rotor secondary mounted on said shaft for rotation therewith within said first stator core, a direct current armature mounted on said shaft for rotation therewith within said second stator core, a commutator for said direct current motor and a plurality of slip rings, said commutator and slip rings mounted on said shaft adjacent each other, means on said shaft for receiving leads within the circumference thereof, semiconductor rectifier means mounted on said shaft for rotation therewith, leads received in said lead receiving means for connecting said wound rotor secondary through said rectifier means to said slip rings, brush means for connecting the output of said slip rings to said commutator, an independent direct current power source for said field windings and means for varying the strength of said direct current field.

3. In an adjustable speed motor drive, a wound rotor alternating current motor and a separately excited direct current motor disposed in a unitary housing including a first stator core having a primary winding thereon supported in said housing, a second stator core having a direct current field winding thereon supported in said housing and axially displaced from said first stator core, a shaft supported for rotation within said housing, a wound rotor secondary mounted on said shaft for rotation therewith within said first stator core, a direct current armature mounted on said shaft for rotation therewith within said second stator core, a commutator for said direct current motor and a plurality of slip rings, said commutator and slip rings mounted on said shaft adjacent each other, means on said shaft for receiving leads within the circumference thereof, semiconductor rectifier means external to said housing, leads received in said lead receiving means for connecting said wound rotor secondary winding to said slip rings, first brush means for connecting said slip rings to the input of said external rectifier means, second brush means for connecting the output of said rectifier means to said commutator, an independent direct current power source for said field windings and means for varying the strength of said direct current field.

References Cited in the file of this patent

UNITED STATES PATENTS

| | | |
|---|---|---|
| 2,066,508 | Young | Jan. 5, 1937 |
| 2,288,338 | Willis | June 30, 1942 |
| 2,319,625 | Ostrander | May 18, 1943 |
| 2,359,145 | Myers et al. | Sept. 26, 1944 |
| 2,634,379 | Brainard | Apr. 7, 1953 |